(12) United States Patent
Opdenbusch et al.

(10) Patent No.: US 12,502,805 B2
(45) Date of Patent: Dec. 23, 2025

(54) METHOD FOR MANUFACTURING MORTAR-BASED ELEMENTS

(71) Applicant: SAINT-GOBAIN WEBER, Sucy-en-Brie (FR)

(72) Inventors: Kersten Opdenbusch, Datteln (DE); Jan Blaakmeer, Hk Best (NL); Bruno Miguel Nunes Lobo, Eindhoven (NL); Lutz Piertzik, Engelskirchen (DE); Tanja Hofmann, Wiesbaden (DE)

(73) Assignee: SAINT-GOBAIN WEBER, Sucy-en-Brie (FR)

( * ) Notice: Subject to any disclaimer, the term of this patent is extended or adjusted under 35 U.S.C. 154(b) by 784 days.

(21) Appl. No.: 17/621,339

(22) PCT Filed: Jun. 24, 2020

(86) PCT No.: PCT/EP2020/067670
§ 371 (c)(1),
(2) Date: Dec. 21, 2021

(87) PCT Pub. No.: WO2020/260375
PCT Pub. Date: Dec. 30, 2020

(65) Prior Publication Data
US 2022/0332015 A1 Oct. 20, 2022

(30) Foreign Application Priority Data

Jun. 26, 2019 (EP) .................................... 19182629

(51) Int. Cl.
*B28C 7/02* (2006.01)
*B28B 1/00* (2006.01)
(Continued)

(52) U.S. Cl.
CPC .............. *B28C 7/024* (2013.01); *B28B 1/001* (2013.01); *B28B 17/0081* (2013.01); *B33Y 10/00* (2014.12); *B33Y 40/10* (2020.01)

(58) Field of Classification Search
CPC .... B28C 7/024; B01F 35/213; B01F 35/2136; C04B 40/0028; B28B 1/001; B28B 17/00
See application file for complete search history.

(56) References Cited

U.S. PATENT DOCUMENTS 4,764,019 A  8/1988 Kaminski et al.
2005/0280185 A1* 12/2005 Russell ................. B29C 64/165
425/375

(Continued)

FOREIGN PATENT DOCUMENTS

WO  WO-2015032878 A1 *  3/2015 .......... B01F 15/0258
WO  WO 2018/202842 A1   11/2018

OTHER PUBLICATIONS

Espacenet translation of "Fabio Rencurosi" (WO2015/032878A1), published Mar. 12, 2015 (Year: 2015).*

(Continued)

*Primary Examiner* — Elizabeth Insler
(74) *Attorney, Agent, or Firm* — Pillsbury Winthrop Shaw Pittman LLP

(57) ABSTRACT

A method is for manufacturing elements including hydraulic binder and aggregates. The method includes mixing a dry mortar composition including hydraulic binder and aggregates with water, to form a wet mortar. The method also includes pumping and conveying the wet mortar towards an outlet. During the conveying at least two physical properties of the wet mortar are measured on-line. The physical properties include viscosity and at least one of flow and density.

21 Claims, 1 Drawing Sheet

(51) Int. Cl.
*B28B 17/00* (2006.01)
*B33Y 10/00* (2015.01)
*B33Y 40/10* (2020.01)

(56) References Cited

U.S. PATENT DOCUMENTS

| | | | |
|---|---|---|---|
| 2015/0298082 A1* | 10/2015 | Machuca | B01F 35/71805 366/152.3 |
| 2017/0066157 A1* | 3/2017 | Peters | B01F 27/724 |
| 2019/0105801 A1* | 4/2019 | Martinez | B28C 7/026 |

OTHER PUBLICATIONS

International Search Report mailed on Aug. 27, 2020 in PCT/EP2020/067670 filed on Jun. 24, 2020 (4 pages).
Anonymous, "Coriolis mass flowmeter with direct in-line viscosity measurement", Endress+Hauser South Africa, South African Instrumentation and Control, URL: https://www.instrumentation.co.za/print.aspx?editorialtype=A&editorialid=3067, Jul. 1, 2004, pp. 1-4.

* cited by examiner

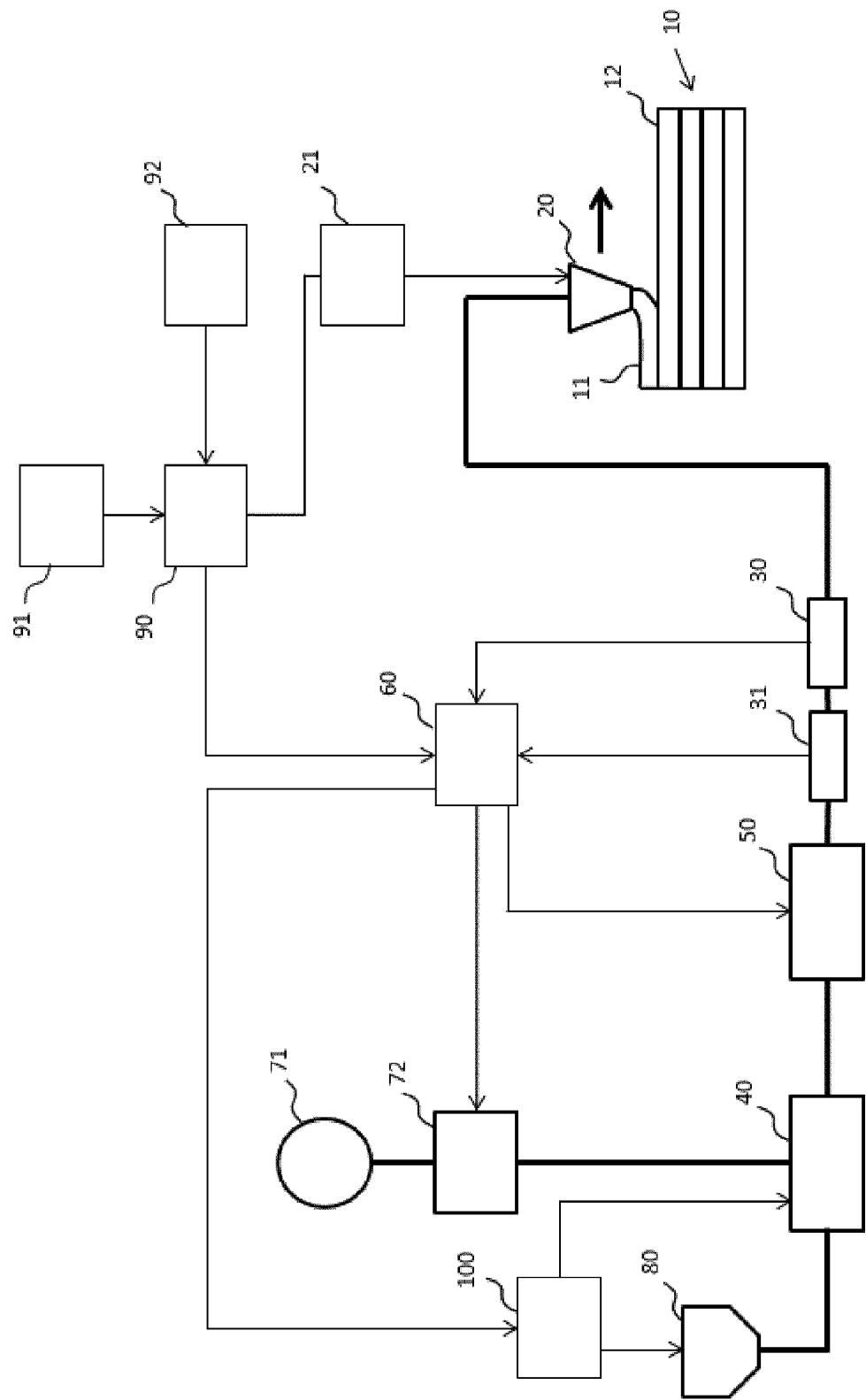

METHOD FOR MANUFACTURING MORTAR-BASED ELEMENTS

BACKGROUND

The present invention relates to a method for manufacturing elements comprising hydraulic binder and aggregates.

Mortar or concrete-based elements can have various shapes and functions, and in the present text, the term "element" encompasses walls, wall coverings (such as renders or plasters), adhesive coatings, floors, floor coverings or flooring compounds (such as screeds), decorative or functional objects etc. Manufacturing such elements usually involves mixing a dry mortar composition comprising hydraulic binder and aggregates with water, to form a wet mortar. This wet mortar is then shaped or applied according to the desired use before setting and hardening to form a hardened mortar.

Automation or mechanization of such methods may provide benefits in terms of cost and productivity, and can involve pumping the wet mortar towards an outlet from which the wet mortar is poured, extruded, or projected.

BRIEF SUMMARY

The invention aims at providing a method which is robust and can guarantee a good quality for the final element.

To this end, an object of the invention is a method according to claim 1.

The inventors have determined that the online measurement of the viscosity of the wet mortar and of at least one other property selected from the flow and the density could have a great benefit in terms of robustness and quality control. Such a measurement may for example allow detecting pumping issues and therefore avoid any risk of blocking. It may also allow a user to detect that the mortar composition or the mixing ratio, i.e. the weight ratio between water and dry mortar, is not fit for purpose.

The density is the specific density of the wet mortar, expressed for example in $kg/m^3$. The flow is the instantaneous flow of wet mortar which is conveyed, expressed for example in kg/h or L/h.

The present disclosure also describes a system for implementing the method according to the invention. Such a system comprises a mixing device adapted to mix a dry mortar composition comprising hydraulic binders and aggregates with water, to form a wet mortar, an outlet, a pumping device adapted to pump and convey said wet mortar towards said outlet, and at least one sensor adapted to measure on-line at least two physical properties of said wet mortar on its way from said mixing device to said outlet, said physical properties including viscosity and at least one of flow and density.

The method according to the invention may for example be a method for depositing a floor (for example a screed) on a horizontal building substrate such as a slab, or for depositing a tile adhesive on a building substrate, or for projecting a render on a vertical building substrate such as a masonry wall, or for spraying concrete.

The method according to the invention is especially suitable as a 3-D printing method. In such a case, the method is a 3-D printing method, the outlet is the head of a computer-controlled printer, and the method further comprises depositing a layer of wet mortar on a previous layer of mortar.

3-D printing, also known as additive manufacturing, is a method in which a computer-controlled robot manufactures three-dimensional objects by depositing material layer by layer. Advantages of such methods include lower labour costs, lower losses of materials and the ability to manufacture objects having complex shapes. Various materials can be manufactured this way, such as polymers or metals.

3-D printing of elements made of concrete or mortars has also been proposed. Also called Contour Crafting or Cementitious Ink Printing, these techniques are now being realized in construction scale applications, and their advantages are the integration of the design, planning and constructions processes coupled with an increase automation and rationalization of building processes. Savings on labour costs, lower losses and consumption of materials, eliminating formwork, shorter projects lengths and capital commitment as well as an increased workspace safety are other driving factors for this technology. In known methods, a wet mortar is continuously produced by mixing a dry mortar composition with water, is pumped and conveyed towards the printer head of a computer-controlled printer, usually a robot or a gantry, and is then deposited as a layer on a previous layer of mortar, usually by being extruded through a nozzle. The printer head is moved according to a predetermined scheme, precisely materializing e.g. complex geometries designed by architects, so as to manufacture the final object.

A key issue in the process is that the wet mortar should be fluid enough to be pumped and conveyed through the process, but should, once deposited as a layer, have a mechanical resistance which is high enough so that it can sustain the load of the next upper layers without collapsing. The use of quick-setting cements, for example obtained by adding setting accelerators or other rheology-modifying agents to the wet mortar just before the deposition of the layer, has been proposed to provide an increased yield stress to the placed material when compared to the material right after the mixing or during the pumping step. Flowable ultra-high performance concretes (UHPC), with a compressive strength of at least 100 MPa at 28 days, have also been proposed. These known techniques have however some drawbacks because the deposition of a layer on a layer that has already started to set and harden leads to weak bonding strengths between the layers, and therefore to a non-monolithic material that may show a low load bearing capacity, especially when the construction is loaded in shear or tension. As the additives are provided as aqueous solutions, a risk of cracking of the material may also arise due to the excess water. In addition, once the additives have been added and mixed in the mortar close to the printing nozzle, usually with the help of a static mixer, there is no possibility for any material correction left, so that any issues arising from the mixing of the dry mortar with water cannot be remedied. On the other hand, the addition of accelerators and thickeners at the stage of mixing or pumping would give rise to flow rates profiles in the pipes that would lead to problems due to the variable residence time distributions of the wet mortar.

In that respect, the invention also aims at providing an improved 3-D printing process of construction materials so as to overcome the abovementioned problems. Especially, the invention aims at improving the printing quality by securing a total control of the quality of the printing material.

In relation to a 3-D printing method, the invention makes it possible to get a good quality of the construction element by using a mortar that may set and harden at a normal speed, without necessarily needing specific additives to be added just before the deposition step. Thanks to their thixotropic properties, the mortars used have a low viscosity at higher shear rates so that they can be easily pumped and conveyed throughout the system, but show an immediate buildup of structural strength as soon as the material leaves the printing nozzle so that the layers of fresh mortars can sustain other layers even before setting and hardening. This "wet-on-wet" deposition makes it possible to improve the adhesion and bonding strength between the successive layers so as to obtain a monolithic element. In the end, the mechanical properties of the final construction element are comparable with the properties of conventional cast concrete elements.

Preferably, said at least two physical properties of the wet mortar are recorded on a computer-readable storage media. The recorded measurements may then be used for quality control purposes, for example to prove that the method has been correctly implemented. In such a case, the system therefore comprises a computer-readable storage media configured to store said at least two physical properties of the wet mortar.

The properties that are measured on-line preferably include, further to viscosity, density and flow, the temperature of the wet mortar. Advantageously, at least three or at least four of these properties are measured on-line during the conveying. For example, the density, the flow, the viscosity and the temperature can be measured.

The two or more physical properties are normally independently measured, by one or more sensor(s). This excludes therefore the case where a first physical property is measured by a sensor, the measurement being then used to calculate a second physical property. In that case, the second physical property cannot be said to be "measured".

Each of these properties may be measured using a dedicated sensor. The system may thus comprise a dedicated sensor for each physical property. Alternatively and preferably several, or even all, of these properties are measured using the same sensor. The system then comprises a sensor adapted to measure several properties. Preferably, the viscosity and at least one of flow and density of the wet mortar are simultaneously measured using the same sensor. The sensor is then able to simultaneously measure the viscosity and at least one of flow and density of the wet mortar.

The sensor is preferably of the Coriolis type, and may measure simultaneously the density, the flow, the viscosity and the temperature of the wet mortar.

The Coriolis type sensor preferably comprises a measuring tube conducting the wet mortar while measuring simultaneously (and normally independently) the density, the flow, the viscosity and the temperature of the wet mortar. The Coriolis type sensor preferably comprises not more than one, i.e. exactly one, measuring tube. Preferably, the measuring tube is a straight measuring tube.

The on-line measurement of said at least two properties takes place during the conveying of the wet mortar towards the outlet, for example towards a nozzle. Therefore, the properties are not measured at the outlet, for instance at the nozzle. They are necessarily measured before the wet mortar enters the outlet. In addition, the on-line measurement is not measured at the place of mixing. The properties are necessarily measured after the mixing step.

Preferably, the on-line measurement of said at least two properties of the wet mortar takes place just after the mixing step. The sensor(s) is (are) therefore preferably positioned as close as possible to the pumping device.

Preferably, the ratio between the water and the dry mortar (mixing ratio) is adjusted depending on the value of at least one of said at least two physical properties. This ratio is preferably adjusted in real time. The ratio may therefore be continuously adjusted, when the mixing is carried out in a continuous manner, or the ratio may be semi-continuously adjusted, when the mixing is carried out so as to produce batch of wet mortar. The mixing ratio corresponds to the ratio used during the mixing step, i.e. the mixing step is carried out with said mixing ratio, and this mixing ratio may be adjusted depending on the measured value(s).

The inventors have indeed determined that it was particularly advantageous to control and adjust, in real time, the mixing ratio, depending on the physical properties of the wet mortar. The method therefore preferably uses a feedback control system that continuously controls the mixing ratio to obtain stable values for some physical properties of the wet mortar. The feedback control system preferably uses an actuator (means for adjusting the flow of mixing water), at least one sensor (to measure the physical property of the wet mortar), and a controller (to control the actuator).

In such an embodiment, the system comprises a first controller configured to adjust the mixing ratio depending on the value of at least one of said at least two physical properties.

The system preferably further comprises a water supply and means for adjusting the dosage of mixing water. Said means are preferably controlled by the first controller. The means for adjusting the flow of mixing water comprise for example a valve and a flowmeter.

Preferably, a predetermined value, respectively a predetermined range is set for at least one of said at least two physical properties, and the mixing ratio is adjusted so that said at least one of said at least two physical properties is equal to said predetermined value, respectively comprised within said predetermined range. The predetermined value or range may depend on at least one parameter selected from the temperature, or humidity, of the wet mortar and/or of the environment, the mortar pressure, and, for a 3-D printing method, the printing speed.

The feedback control system which has been described is especially advantageous for a 3-D printing method and system.

The hydraulic binder is preferably selected from Ordinary Portland Cements (OPC), Calcium Aluminate Cements (CAC), Calcium Sulfoaluminate Cements (CSA), unhydrated lime, hydrated lime, ground granulated blast furnace slags, fly ashes and mixtures thereof. The hydraulic binder preferably comprises OPC. OPC is even, preferably, the main or even the sole hydraulic binder.

Aggregates are preferably selected from siliceous, calcareous aggregates, such as ground limestone or sand, and mixtures thereof. The maximum size of the aggregates is preferably less than or equal to 3 mm, even to 2 mm, or to 1 mm, due to the limited cross-sections of the pumping device and the nozzle.

The dry mortar preferably also comprises additives, especially additives selected from superplasticizers, thickeners, accelerators, retarders, and mixtures thereof. Thickeners may be organic or inorganic. The dry mortar advantageously comprises inorganic thickeners able to increase the yield stress of the mortar at rest, such as swelling clays. Accelerators and retarders are additives that accelerate or retard setting and/or hardening of the hydraulic binder.

The dry mortar composition is preferably adjusted so that the wet mortar shows a thixotropic behavior. The thixotropic behavior is preferably such that the viscosity of the wet mortar increases by a factor of 50 or more 1 second after leaving the outlet (for example the printing nozzle).

The system preferably comprises a dry mortar storage and a dosing device. The dosing device preferably comprises electronic flowmeters and valves, in order to achieve a high accuracy level for the mixing ratio (for example less than 0.1%).

The mixing ratio (i.e. the weight ratio of water to dry mortar) ranges preferably from 0.1 to 0.2.

The pumping device preferably comprises a frequency converter to control the pumping speed.

The wet mortar is preferably conveyed through a hose.

The density of the wet mortar is typically between 1800 and 2500 kg/m$^3$, preferably between 2000 and 2400 kg/m$^3$.

The flow of the wet mortar during conveying is typically between 100 and 20000 L/h, preferably between 150 and 1000 L/h.

The viscosity of the wet mortar during conveying is preferably between 400 and 3000 cP, typically between 800 and 1600 cP (1 Poise=0.1 Pa.$).

The temperature of the wet mortar during conveying is preferably between 10 and 50° C., typically between 15 and 40° C., and even 20 to 35° C.

The pressure of the wet mortar during conveying is preferably between 5 and 60 bars, especially lower than 45 bars.

The outlet may be for example a nozzle, from which the wet mortar can be deposited, extruded, projected or sprayed.

When the method according to the invention is a 3-D printing method, the system (called 3-D printing system) further comprises a computer-controlled printer having a head comprising the outlet, and which is adapted to deposit a layer of mortar on a previous layer of mortar.

The printer may be any device able to position and move a printer head according to instructions received. It may be for example a robot or a gantry. The printer head comprises a printing nozzle, through which the wet mortar is extruded to form a layer. The nozzle can have any adapted shape.

The head may optionally comprise means for adding to the wet mortar, just before it is deposited as a layer, any additional component, such as additives, aggregates or fibers.

The printing speed is preferably between 50 and 1000 mm/s, for example between 50 and 300 mm/s. The layer thickness typically varies from 5 to 40 mm, preferably from 10 to 20 mm. The width of the layers typically varies from 20 to 200 mm, typically from 40 to 120 mm.

The 3-D printing system preferably further comprises at least one of the following additional devices:
- a second controller configured to control the printer head, for example the position and the speed of the printer head,
- a third controller configured to control the dosage of the dry mortar and/or the mixing of the components of the dry mortar,
- a central main controller configured to control the whole system and process, especially configured to control at least one from the first and second controllers.

At least one, preferably each, and especially the first, controller preferably comprises or is implemented by computer means, such as a processor, for receiving instructions and/or data and for generating machine instructions executable by other controllers of the system and/or by specific devices of the system. At least some, preferably all, controllers are advantageously programmable logic controllers (PLC). The computer means may also include, in addition to at least one processor, computer-readable storage media storing computer program instructions that, when executed, may generate the above-mentioned machine instructions. Several controllers may use the same processor and/or the same computer-readable media. Some controllers may also comprise a graphical user interface (GUI) in order to display information related to the printing and/or to provide input from the user.

Therefore, the term "control", used throughout the present document, may include the generation of machine instructions executable by the device which is controlled, for example a mixing device, a pumping device or another controller.

The central main controller is preferably configured to receive model data specifying a 3D model of the construction element to print and to control the first and the second controllers according to said model data and/or according to inputs from a user. The central main controller may for example be used to input, via an interface, such as a GUI, a desired printing speed and/or a desired height or width of the mortar layers.

The first controller is preferably configured to receive instructions from the central main controller, to receive data from the sensor(s), and to control the means for adjusting the flow of mixing water. Instructions received from the central main controller depend for example on the printing speed or on the height or width of the layers to be deposited. Data from the sensor(s) include the values of the physical property of the wet mortar, such as its density, flow, viscosity and/or temperature. The first controller may in addition receive data including the pressure in the pumping device.

The first controller is in addition preferably configured to control the pumping device, so as for example to adjust the pumping speed.

The first controller may also be configured to control the third controller. Alternatively, the first controller may be configured to directly control the dosage of the dry mortar and/or the mixing of the components of the dry mortar.

The first controller preferably comprises a memory configured to record the successive values of the at least one physical property of the wet mortar. This feature may for example have an interest in the framework of a quality control system.

The first controller is what is called a closed-loop controller or a feedback controller. Therefore, the adjustment of the flow of mixing water is made by a feedback control system. Any kind of known controller can be used, for example a PID controller.

According to a preferred feature, the first controller may be configured to determine, from the values received for at least one physical property of the wet mortar, if the mortar composition conforms to predetermined specifications, for example in terms of composition. In the negative, the first controller may be configured to stop the printing. This feature may be implemented to secure safety process conditions and/or to prevent the users of the system from using a non-compliant or incompatible mortar.

BRIEF DESCRIPTION OF THE DRAWINGS

The invention will now be described in more detail by reference to a non-limiting example.

FIG. 1 shows an example system used for implementing a method according to the invention.

DETAILED DESCRIPTION

The system of FIG. 1 is a 3-D printing system comprising a printer having a printer head 20 adapted to extrude wet mortar through a nozzle so as to deposit a layer of wet mortar 11 on a previous mortar layer 12, and to manufacture a construction element 10. The printer is for example an industrial robot or a gantry and the wet mortar may be conveyed to the head through a hose.

The construction element 10 can be for example a wall, a bridge element, a decorative element, a complex formwork for casting concrete etc.

The wet mortar is produced by mixing a dry mortar composition with water in a mixing device 40. Mixing is done with a certain mixing ratio.

The dry mortar composition is stored in a silo 80. Alternatively, the system may comprise several silos or containers containing each of the components of the dry mortar composition, as well as means for mixing the appropriate amounts of each component in order to obtain the desired dry mortar composition.

The dry mortar composition comprises for example Portland cement, siliceous aggregates, limestone filler, rheology modifiers, additives and fibers.

Water is stored in a water supply 71, and the dosage of water (impacting the mixing ratio) is adjusted through means 72 comprising for example a valve and a flowmeter. The wet mortar is continuously pumped through a pumping device 50, which is for example a pump, such as a screw pump. The wet mortar is pumped and conveyed towards the printer head 20, and on its way from the mixing device 40 to the printer head 20, at least one of its physical properties is measured on-line by a sensor 30. The measurement is made preferably close to the mixing device.

The sensor 30 is for example a sensor of the Coriolis type, which is able to measure simultaneously the density, the flow, the viscosity and the temperature of the wet mortar. The system may also comprise another sensor 31 able to measure other properties, for example the pressure.

The system shown in FIG. 1 is controlled through several controllers. These controllers preferably comprise processors for receiving instructions and/or data and for generating machine instructions executable by other controllers or by specific devices. These controllers can be programmable logic controllers (PLC).

A central main controller 90 is configured to receive model data specifying a 3D model of the construction element 10 to be printed. These model data are typically stored in a computer-readable storage media 92. The central main controller 90 can be controlled by a controller 91 that may be manually controlled by a user, for example to start or stop the system or to adjust the printing speed. At least one of controllers 90 and 91 comprises an interface, such as a GUI.

The central main controller 90 is also configured to control the first controller 60 and the second controller 21, for example by generating machine instructions executable by these controllers. These instructions are for example instructions to change the printing speed and/or the height or the width of the layers, according to the model data or the instructions given by the user.

The second controller 21 controls the printer head 20. It is configured to receive instructions from the central main controller 90 and to generate machine instructions so as to control for example the position and the speed of the printer head 20.

The first controller 60 controls the system for controlling and adjusting the physical properties of the wet mortar by adjusting the mixing ratio. It is configured to receive data from sensors 30 and 31 and adjust in consequence the flow of mixing water and therefore the mixing ratio by generating instructions executable by the means 72.

The first controller 60 typically compares in real time the measured value, for example of the viscosity of the wet mortar, with a predetermined range to calculate a control deviation and if needed adjust the water dosage (and therefore the mixing ratio), by adjusting the flow of water.

The first controller 60 may also generate instructions executable by the pumping device 50, in order for example to adjust the pumping speed according to the desired printing speed.

The first controller 60 may also generate instructions executable by a third controller 100 that can control the dosage of the dry mortar, for example the flow of the dry mortar. The third controller 100 may also control the mixing of the individual components of the dry mortar.

By using this system, high quality construction elements have been manufactured.

The invention claimed is:

1. A 3-D printing method for manufacturing elements comprising hydraulic binder and aggregates, said method comprising:
    mixing with a mixing device a dry mortar composition comprising hydraulic binder and aggregates with water, to form a wet mortar,
    pumping and conveying said wet mortar using a pump positioned downstream of the mixing device towards a printing nozzle of a computer-controlled 3-D printer,
    wherein the wet mortar is conveyed from the pump to the printing nozzle using a hose,
    wherein one or more sensors are arranged between the pump and the printing nozzle such that during said conveying of the wet mortar in the hose towards the printing nozzle at least two physical properties of the wet mortar are measured on-line upstream of the printing nozzle before the wet mortar enters the printing nozzle and downstream of the pump after the wet mortar passes through the pump, said physical properties including viscosity and at least one of flow and density,
    adjusting a flow of water sent to the mixing device based on data received from the one or more sensors, and
    depositing, by extruding the wet mortar through the printing nozzle of the computer-controlled 3-D printer, a layer of wet mortar on a previous layer of mortar.

2. The method according to claim 1, wherein said at least two physical properties of the wet mortar are recorded on a computer-readable storage media.

3. The method according to claim 1, wherein the viscosity and at least one of flow and density of the wet mortar are simultaneously measured using a same sensor of the one or more sensors.

4. The method according to claim 3, wherein the density, the flow, the viscosity and the temperature of the wet mortar are simultaneously measured using the same sensor.

5. The method according to claim 1, wherein a ratio between the water and the dry mortar is adjusted depending on a value of at least one of said at least two physical properties.

6. The method according to claim 5, wherein the ratio between the water and the dry mortar is adjusted in real time.

7. The method according to claim 5, wherein a predetermined value, respectively a predetermined range is set for at least one of said at least two physical properties, and the ratio between the water and the dry mortar is adjusted so that the value of at least one of said at least two physical properties is equal to said predetermined value, respectively comprised within said predetermined range.

8. The method according to claim 1, wherein the dry mortar comprises additives selected from superplasticizers, thickeners, accelerators, retarders, and mixtures thereof.

9. The method according to claim 1, wherein the maximum size of the aggregates is less than or equal to 3 mm.

10. The method according to claim 1, wherein the dry mortar composition is adjusted so that the wet mortar shows a thixotropic behavior.

11. The method according to claim 1, wherein the density of the wet mortar is between 1800 and 2500 kg/m$^3$.

12. The method according to claim 1, wherein the flow of the wet mortar during conveying is between 100 and 20000 L/h.

13. The method according to claim 1, wherein the viscosity of the wet mortar during conveying is between 400 and 3000 cP.

14. The method according to claim 1, wherein the dry mortar composition is adjusted so that a viscosity of the wet mortar increases by a factor of 50 or more 1 second after leaving the outlet.

15. The method according to claim 1, wherein the density of the wet mortar is between 2000 and 2400 kg/m$^3$.

16. The method according to claim 1, wherein the flow of the wet mortar during conveying is between 150 and 1000 L/h.

17. The method according to claim 1, wherein the viscosity of the wet mortar during conveying is between 800 and 1600 cP.

18. The method according to claim 1, wherein a controller is configured to adjust the flow of water sent to the mixing device based on the data received from the one or more sensors.

19. The method according to claim 1, further comprising controlling a speed of the pump using a controller based on data received by the controller from the one or more sensors.

20. The method according to claim 1, wherein the pump is a screw pump.

21. The method according to claim 1, comprising controlling, with a controller using the data received from the one or more sensors, a valve or a flowmeter to adjust the flow of water sent to the mixing device.

* * * * *